(12) United States Patent
Seiniger et al.

(10) Patent No.: US 8,155,798 B2
(45) Date of Patent: Apr. 10, 2012

(54) METHOD AND DEVICE FOR DETERMINING THE ROLL ANGLE OF A MOTORCYCLE

(75) Inventors: Patrick Seiniger, Darmstadt (DE); Hermann Winner, Bietigheim (DE); Friedrich Kolb, Dittelsheim-Hessloch (DE); Vladimir Koukes, Darmstadt (DE); Peter Olejnik, Rosbach (DE); Alfred Eckert, Mainz-Hechtsheim (DE); Michael Kremer, Darmstadt (DE)

(73) Assignee: Continental Teves AG & Co. oHG (DE)

( * ) Notice: Subject to any disclaimer, the term of this patent is extended or adjusted under 35 U.S.C. 154(b) by 736 days.

(21) Appl. No.: 12/280,229

(22) PCT Filed: Feb. 19, 2007

(86) PCT No.: PCT/EP2007/051545
§ 371 (c)(1),
(2), (4) Date: Nov. 26, 2008

(87) PCT Pub. No.: WO2007/096319
PCT Pub. Date: Aug. 30, 2007

(65) Prior Publication Data
US 2009/0222164 A1    Sep. 3, 2009

(30) Foreign Application Priority Data

Feb. 22, 2006  (DE) .......................... 10 2006 008 204
Mar. 18, 2006  (DE) .......................... 10 2006 012 533
Oct. 6, 2006   (DE) .......................... 10 2006 047 737
Dec. 23, 2006  (DE) .......................... 10 2006 061 483

(51) Int. Cl.
B60T 8/17      (2006.01)
B60T 8/172     (2006.01)

(52) U.S. Cl. ............................. 701/1; 702/151; 701/30.3
(58) Field of Classification Search ................... None
See application file for complete search history.

(56) References Cited

U.S. PATENT DOCUMENTS

| | | | | |
|---|---|---|---|---|
| 5,445,443 A * | 8/1995 | Hauser et al. | ................. | 303/137 |
| 6,292,759 B1 * | 9/2001 | Schiffmann | ................. | 702/151 |
| 6,502,023 B1 | 12/2002 | Fukada | | |
| 6,650,971 B2 | 11/2003 | Haas | | |
| 6,681,196 B2 | 1/2004 | Glaser et al. | | |
| 6,694,226 B2 | 2/2004 | Tobaru et al. | | |
| 7,158,866 B2 * | 1/2007 | Gustafsson et al. | ............. | 701/1 |
| 2006/0155440 A1 * | 7/2006 | Gleacher | ........................ | 701/38 |

FOREIGN PATENT DOCUMENTS

| | | | |
|---|---|---|---|
| DE | 10003832 A1 * | 8/2001 | |
| DE | 101 15 217 C1 | 8/2002 | |
| DE | 103 50 046 A1 | 5/2005 | |
| DE | 103 50 047 A1 | 5/2005 | |
| DE | 10 2004 021 590 A1 | 12/2005 | |
| EP | 1 002 709 A2 | 5/2000 | |
| JP | 2001074449 | 3/2001 | |
| WO | WO 01/44020 A1 | 6/2001 | |

* cited by examiner

Primary Examiner — Michael J. Zanelli
(74) Attorney, Agent, or Firm — RatnerPrestia

(57) ABSTRACT

A device and method for determining a roll angle of a motorcycle are disclosed. The method includes the step of acquiring a rolling rate ($\dot{\lambda}^M$) of the motorcycle. A first roll angle variable ($\lambda_1$) is determined from the rolling rate ($\dot{\lambda}^M$). At least one vehicle movement dynamics characteristic variable is determined from a velocity (v), a rotational speed ($\dot{\psi}^M$), and/or an acceleration ($\ddot{z}^M$, $\ddot{y}^M$) of the motorcycle. A second roll angle variable ($\lambda_2$) is determined from one or more vehicle movement dynamics characteristic variables. The roll angle ($\lambda_E$) is calculated on the basis of the roll angle variables ($\lambda_1$, $\lambda_2$).

21 Claims, 4 Drawing Sheets

METHOD AND DEVICE FOR DETERMINING THE ROLL ANGLE OF A MOTORCYCLE

CROSS REFERENCE TO RELATED APPLICATIONS

This application is the U.S. national phase application of PCT International Application No. PCT/EP2007/051545, filed Feb. 19, 2007, which claims priority to German Patent Application No. DE102006008204.4, filed Feb. 22, 2006, German Patent Application No. DE102006012533.9, filed Mar. 18, 2006, German Patent Application No. DE102006047737.5, filed Oct. 6, 2006, and German Patent Application No. DE102006061483.6, filed Dec. 23, 2006, the contents of such applications being incorporated by reference herein.

BACKGROUND OF THE INVENTION

1. Field of the Invention

The invention relates to a method for determining the roll angle of a motorcycle and to a device for determining the roll angle of a motorcycle.

2. Description of the Related Art

Modern motorcycle antilock brake systems (ABS) and integral brake systems are very highly developed and therefore relatively reliable for braking operations during straight-ahead travel and braking operations in moderately sloping positions. In relatively severely sloping positions, the parameters of the brake system (for example the distribution of the braking force, the gradient of the braking pressure and the control strategy) have to be adapted to cornering in order also to ensure safe braking when cornering occurs. Knowledge of the sloping position angle (roll angle) is essential for this. However, turning light systems, chassis systems and future vehicle movement dynamics control systems also require the roll angle as an input variable. Known systems for measuring the roll angle during driving are either too inaccurate or too expensive for series applications. The underlying measurement principles for determining the roll angle are either suitable only for steady-state situations or only for non-steady-state travel situations.

Document DE 100 39 978 C2 discloses a device for measuring the angle of inclination with respect to the direction of gravity or the direction of the resulting contact force which comprises a sensor arrangement and an evaluation unit which is connected in an electrically conductive fashion, in which case the sensor arrangement has two acceleration sensors, and the evaluation unit calculates the angle of inclination on the basis of the measured acceleration values.

Document DE 42 44 112 C2 discloses an antilock brake system for motorcycles which comprises, inter alia, an auxiliary circuit which calculates the angle of the sloping position of the vehicle by means of two acceleration sensors.

A method for determining the roll angle and the pitch angle of a two-wheeled vehicle using an adaptive filter is described in WO 02/01151.

An object of the invention is making available a method and a device for determining the roll angle of a motorcycle which permits reliable determination of the roll angle with a high level of accuracy at the same time. In this context, the cost of implementing the method and of manufacturing the device are to be low.

SUMMARY OF THE INVENTION

A method for determining a roll angle of a motorcycle is described herein. According to aspects of the invention, the method is based on the idea of combining the results or information from two or more different methods for determining a roll angle with one another in order thus to obtain a sufficiently accurate roll angle using cost-effective sensors in all travel situations (steady-state or non-steady-state). For this purpose, a first roll angle variable is determined from an acquired rolling rate of the vehicle using a first method. At least a second roll angle variable is determined from one or more further vehicle movement dynamics characteristic variables. The roll angle is then calculated from the at least two roll angle variables which are determined.

According to one preferred embodiment of the method, according to aspects the invention, the roll angle is calculated from the roll angle variables by addition.

Furthermore, it is preferred that the roll angle variables are filtered before the roll angle is calculated from them.

It is advantageous to filter the rolling rate with a high pass filter before it is used to calculate the first roll angle variable. This increases the fault tolerance of the method. It has proven particularly advantageous to use a high pass filter with a cut-off frequency of approximately 0.01 Hz for the filtering.

The rolling rate is preferably acquired by means of a rotational speed sensor which is mounted on the vehicle. The position of the rotational speed sensor on the motorcycle is not relevant since the rotational speeds on the entire vehicle are the same.

A first roll angle variable is preferably calculated from the rolling rate by integration over time. For small pitch angles, a rolling rate which is fixed to the motorcycle and a rolling rate which is fixed to the roadway closely resemble each other, and integration of the rolling rate which is fixed to the motorcycle results briefly in a roll angle variable which represents the roll angle.

According to one preferred embodiment of the method the first roll angle variable is filtered with a high pass filter before it is used to calculate a roll angle. This reduces falsifications of the roll angle due to measurement errors of the rotational speed sensor. A high pass filter with a cut-off frequency of approximately 0.05 Hz is particularly preferably used.

Furthermore it is advantageous to filter the second roll angle variable with a low pass filter before it is used to calculate the roll angle since the relationships between the vehicle movement dynamics characteristic variables which form the basis of the determination of the second roll angle variable apply only in the case of steady-state cornering. A high pass filter with a cut-off frequency of approximately 0.05 Hz is particularly preferred.

The cut-off frequency of the low pass filter which is used to filter the second roll angle variable preferably has the same value, or approximately the same value, as the cut-off frequency of the high pass filter which is used to filter the first roll angle variable. This ensures uninterrupted determination of the roll angle over the entire frequency range. The cut-off frequency particularly preferably is in the range from approximately 0.01 Hz to approximately 0.10 Hz. The cut-off frequency which is used for the high pass filter and the low pass filter is quite particularly preferably 0.05 Hz. The lowest possible cut-off frequency is advantageously selected.

When more than two roll angle variables are added, the cut-off frequencies of the high pass filter, bandpass and filter low pass filter which are used are selected in such a way that the roll angle is determined over the entire frequency range.

According to one preferred embodiment of the method the second roll angle variable is acquired either from the product of a yaw rate and a vehicle velocity, or from a yaw rate, a vehicle velocity and a vertical acceleration of the vehicle, or from a vertical acceleration of the vehicle, or from a vertical acceleration and a lateral acceleration of the vehicle. The yaw rate is particularly preferably determined by means of a rotational speed sensor. The vehicle velocity is particularly preferably determined from the measurement variables of at least one rotational speed sensor.

The roll angle variable or variables is/are preferably determined from the respective vehicle movement dynamics characteristic variable or variables on the basis of one or more characteristic curves which are stored in a control unit or at least one characteristic diagram which is stored in a control unit. When the second roll angle variable is acquired from the yaw rate and vehicle velocity, the determination is particularly preferably carried out by means of a characteristic diagram or a characteristic curve.

Alternatively, the second roll angle variable or variables is/are preferably calculated from the respective vehicle movement dynamics characteristic variable or variables on the basis of a calculation algorithm.

According to one development of the method two or more second roll angle variables are determined in different ways from the vehicle movement dynamics characteristic variables. These second roll angle variables which are determined in different ways are then used for plausibility checking of the roll angle. For the purpose of plausibility checking, the second roll angle variables which are determined in different ways and/or from different vehicle movement dynamics characteristic variables are particularly preferably compared with one another. Alternatively, a roll angle is respectively calculated from the first roll angle variable and one of the second roll angle variables, and these roll angles are compared with one another. Quite particularly preferably, at least one of the second roll angle variables is determined from at least one acceleration of the vehicle.

A malfunction of a sensor which is being used is preferably detected on the basis of the comparison of the second roll angle variables or roll angles which are determined in different ways. If the second roll angle variable which is calculated from the values of a sensor differs from the other roll angle variables, a malfunction of the sensor is possibly occurring. Rapid and simple detection of a faulty sensor is therefore possible. In this way, a fault in an acceleration sensor is particularly preferably detected.

It is likewise preferred to use the acquired acceleration values to determine an offset of the rotational speed sensor in order to determine the rolling rate.

A linearity fault of the rolling rate is advantageously determined using the offset which is determined in this way. Said linearity fault can then be used to correct the rolling rate and the accuracy of the method is therefore improved further.

The acceleration sensors are preferably also used to calculate the roll angle when the vehicle is stationary.

According to a further preferred embodiment of the method the roll angle is calculated by weighted summing from the at least two roll angle variables which are determined, with the corresponding weighting parameters being adapted as a function of the current travel situation. The travel situation is detected here on the basis of at least one of the following variables: engine speed, engine torque, steering angle, vehicle velocity, vehicle acceleration, wheel speeds, state of the roadway, rolling rate, yaw rate, roll angle acceleration, yaw angle acceleration, roll angle, wheel slip, vehicle load, inclination of the roadway. The calculated roll angle is particularly preferably used, during the optimization of the weighting parameters, as an input variable for assessing the travel situation (iterative calculation of the roll angle).

In addition to the first roll angle variable which is determined from the rolling rate, a second roll angle variable is preferably determined from a vertical acceleration and a lateral acceleration of the vehicle, and a further second roll angle variable is determined from the product of a yaw rate and a vehicle velocity, and the roll angle is calculated from the three roll angle variables, in particular filtered with a high pass filter or low pass filter, by weighted summing with weighting parameters, the weighting parameters being adapted as a function of the current travel situation, which is detected on the basis of at least one of the following variables: engine speed, engine torque, steering angle, vehicle velocity, vehicle acceleration, wheel speeds, state of the roadway, rolling rate, yaw rate, roll angle acceleration, yaw angle acceleration, roll angle, wheel slip, vehicle load and inclination of the roadway.

It is likewise preferred for the properties of the filters which are used to filter the roll angle variables to be selected as a function of the current travel situation. The cut-off frequencies of the filters are particularly preferably selected as a function of the current travel situation.

The device, according to aspects of the invention, is based on the idea that an adding circuit is used to add at least two roll angle variables to form a roll angle, in which case a first roll angle variable is determined from a rolling rate of the vehicle, and a second roll angle variable is determined using at least one vehicle movement dynamics characteristic variable.

According to one development of the device said device has at least one evaluation unit which contains an integrating circuit with which the first roll angle variable is determined from the rolling rate by integration. In this context, the device particularly preferably comprises a filter with which the rolling rate is filtered before it is integrated.

The device advantageously comprises at least one evaluation unit with a high pass filter with which the first roll angle variable is filtered before it is used to calculate the roll angle.

Furthermore, the device preferably comprises, in at least one evaluation unit, a low pass filter with which the second roll angle variable is also filtered before it is used to calculate the roll angle.

The low pass filter for filtering the second roll angle variable preferably has the same or approximately the same cut-off frequency as the high pass filter for filtering the first roll angle variable. As a result, uninterrupted determination of the roll angle is ensured over the entire frequency range during the subsequent addition of the roll angle variables.

According to one preferred embodiment of the device at least one evaluation unit comprises a circuit with which the second roll angle variable is determined from a yaw rate and a vehicle velocity, or from a yaw rate, a vehicle velocity and a vertical acceleration of the vehicle, or from a vertical acceleration of the vehicle, or from a vertical acceleration and a lateral acceleration of the vehicle.

The means for acquiring the rolling rate and/or the means for acquiring the yaw rate of the vehicle are/is preferably one or more rotational speed sensors. A rotational speed sensor or sensors which is/are already known within the scope of vehicle movement dynamics control systems in motor vehicles is/are particularly preferably used.

The means for acquiring the velocity of the vehicle is preferably at least one wheel speed sensor. Such a wheel speed sensor is usually already provided in the vehicle within the scope of an antilock brake system.

According to one preferred embodiment of the device the means for acquiring at least one acceleration value is an acceleration sensor or a group of acceleration sensors. The sensor is particularly preferably a sensor of a vehicle movement dynamics control system, quite particularly preferably a sensor of an electronic stability program (ESP). Such sensors are technically mature and therefore can be used without additional development costs.

One advantage of the invention is that by using sensors which are already known in the prior art, cost-effective and at the same time accurate determination of the roll angle of the vehicle is possible.

The invention also comprises the use of a method in at least one of the following systems: electronically controlled brake system, turning light system, chassis system, electrical steering system and vehicle movement dynamics control system.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
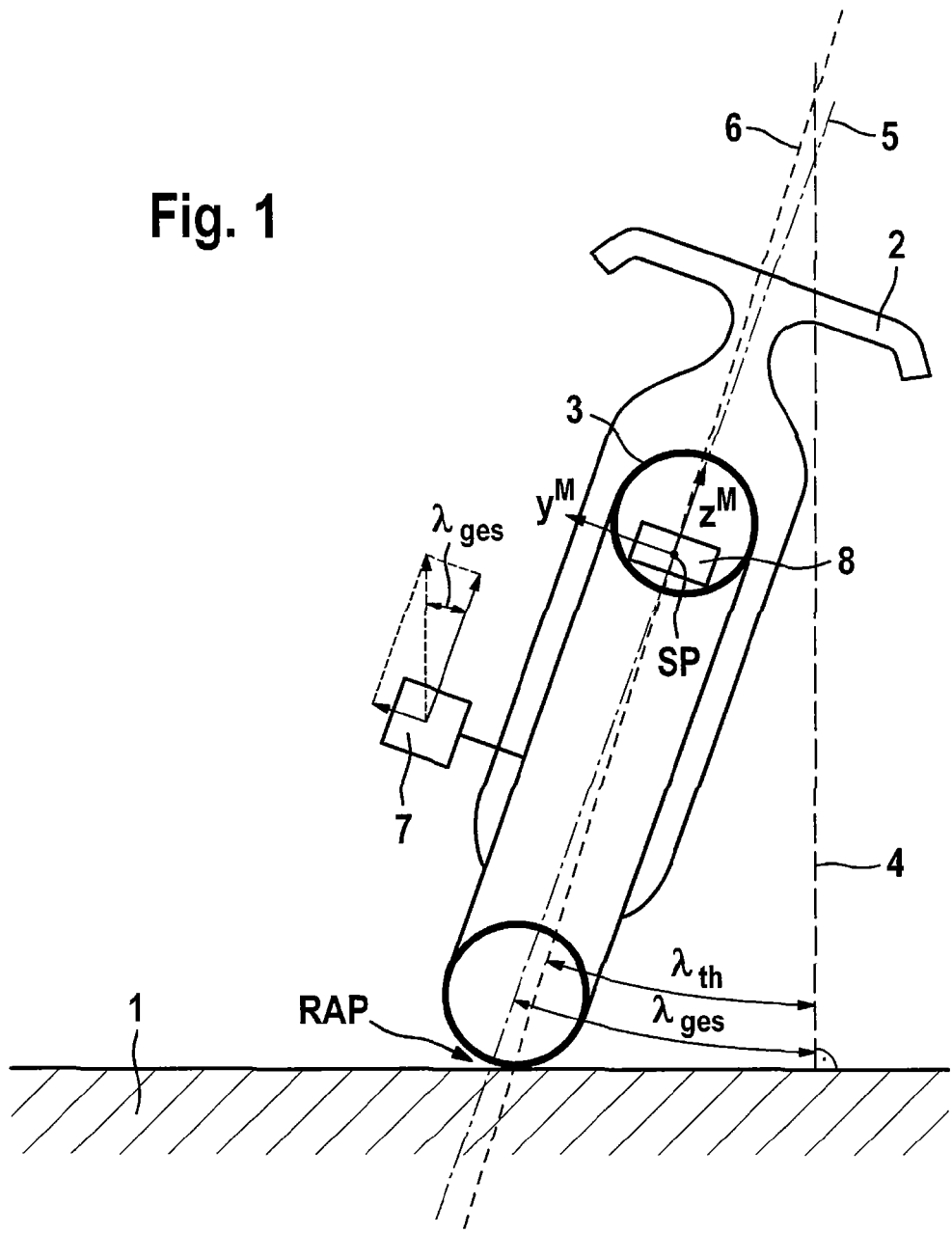
FIG. 1 is a schematic illustration of a motorcycle in a sloping position.

The core of the device or of the method for determining the roll angle (angle of inclination) of a vehicle, in particular a motorcycle, during driving is the combination of at least two individual calculation results (for steady-state travel and non-steady-state travel), in particular by means of a specific filter. FIG. 1 is a schematic illustration of a number of variables which are relevant to the method according to aspects of the invention. A motorcycle 2 travels in an sloping position on roadway 1. A tire 3 of the motorcycle 2 is illustrated in sectional form. Line 4 represents the direction of the perpendicular to the roadway, and line 5 represents the axis of symmetry of the motorcycle 5. At the center of gravity SP of the motorcycle 2, the coordinate system which is fixed to the motorcycle is indicated by the vertical axis $z^M$, which is fixed to the motorcycle and which runs parallel to the axis of symmetry of the motorcycle 5, and the transverse axis $y^M$, which is perpendicular thereto and is fixed to the motorcycle. Line 6 represents the connecting line, projected into the y/z plane, between the center of gravity SP of the motorcycle 2 and the wheel contact point or wheel contact line RAP. The total roll angle $\lambda_{ges}$ corresponds to the angle between the perpendicular 4 to the roadway and the plane 5 of symmetry of the vehicle, and the physically active roll angle $\lambda_{th}$ corresponds to the angle between the perpendicular 4 to the roadway and the line 6. By way of example, one or more sensors 7, for example a rolling rate sensor for determining the rolling rate $\dot{\lambda}^M$ which is fixed to the motorcycle and/or a yaw rate sensor for determining the yaw rate $\dot{\psi}^M$ which is fixed to the motorcycle, is/are arranged laterally on the motorcycle 2. Alternatively or additionally, one or more sensors or a sensor cluster 8 can be arranged on the motorcycle 2, in particular in the region of the center of gravity SP, these being, for example, a yaw rate sensor for determining the yaw rate $\dot{\psi}^M$ which is fixed to the motorcycle and/or acceleration sensor or sensors for determining the vertical acceleration $\ddot{z}^M$ which is fixed to the motorcycle and/or the lateral acceleration $\ddot{y}^M$ which is fixed to the motorcycle. The position of the rolling rate sensor and the position of the yaw rate sensor on the motorcycle 2 are advantageously not relevant.

In customary tires, the total roll angle $\lambda_{ges}$ is approximately 10% to 20% above the physically active roll angle $\lambda_{th}$. The difference between the total roll angle $\lambda_{ges}$ and the physically active roll angle $\lambda_{th}$ is also referred to as the additional roll angle $\lambda_{ZS}$. The following therefore applies:

$$\lambda_{ges}=\lambda_{ZS}+\lambda_{th} \tag{1}$$

In customary tires, the additional roll angle $\lambda_{ZS}$ which is conditioned by the width of the tire is, as has already been mentioned above, of the order of magnitude of approximately 10% to 20% of the physically active roll angle $\lambda_{th}$. Since $\lambda_{ZS}$ is small compared to $\lambda_{th}$, the total roll angle $\lambda_{ges}$ is often approximated by the physically active roll angle $\lambda_{th}$:

$$\lambda_{ges}\approx\lambda_{th}$$

For small pitch angles, the rolling rate $\dot{\lambda}^M$ which is fixed to the motorcycle and the rolling rate $\dot{\lambda}^{roadway}$ which is fixed to the roadway are similar to one another. Integration of the rolling rate $\dot{\lambda}^M$ gives rise to the (total) roll angle $\lambda_{ges}$ (this corresponds to the first roll angle variable $\lambda_1$ in the exemplary embodiments in FIGS. 2, 3 and 4).

Figure 2:
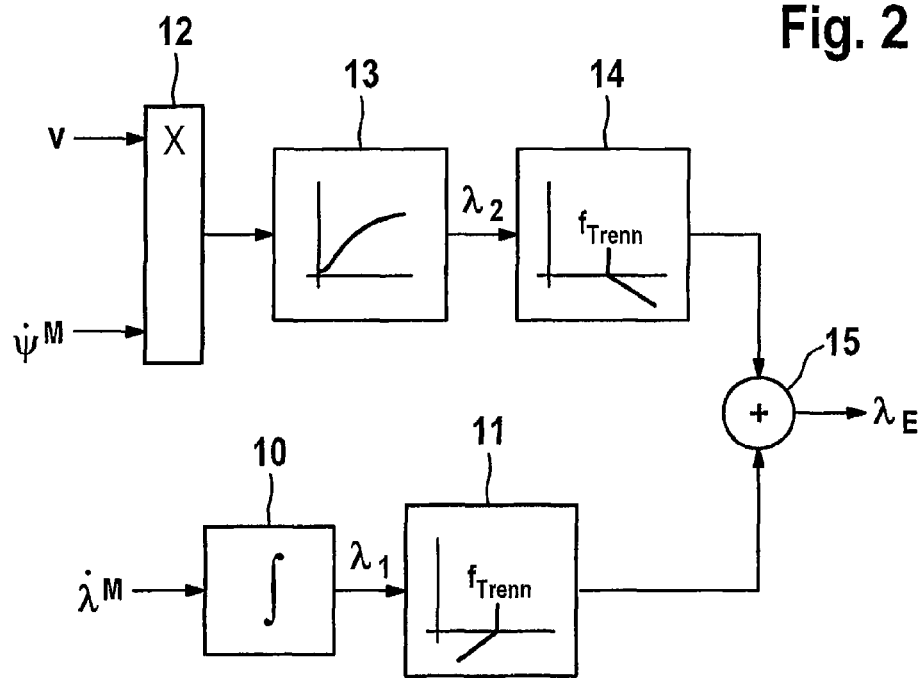
FIG. 2 is a schematic illustration of a first exemplary embodiment of a method, according to aspects of the invention.

A first exemplary embodiment of a method is illustrated schematically in FIG. 2. The integration 10 over time of the rolling rate $\dot{\lambda}^M$ which is fixed to the motorcycle is here a first calculation result (first roll angle variable $\lambda_1$). For example, the calculation result $\lambda_1$ is filtered with the high pass filter 11, which has, for example, a cut-off frequency $f_{Trenn}$ of 0.05 Hz. In the illustrated first exemplary embodiment, the second calculation result (second roll angle variable $\lambda_2$) is obtained as a function 13 of the product 12 of the yaw rate $\dot{\psi}^M$ which is fixed to the motorcycle and the velocity v of the motorcycle. For example, the calculation result $\lambda_2$ is filtered with the low pass filter 14, which has, for example, the same cut-off frequency $f_{Trenn}$ as the high pass filter 11, for example 0.05 Hz. In order to determine the roll angle $\lambda_E$ of the motorcycle, the calculation result $\lambda_1$ of the integration 10 over time of the rolling rate $\dot{\lambda}^M$ which is fixed to the motorcycle and the calculation result $\lambda_2$ is added to a function 13 of the product 12 of the yaw rate $\dot{\psi}^M$ which is fixed to the motorcycle and the velocity v (block 15).

The calculation of the first roll angle variable $\lambda_1$ by integration 10 of the rolling rate $\dot{\lambda}^M$ which is fixed to the motorcycle applies both to steady-state and to non-steady-state travel. However, the calculation by integration 10 of the measurement error of the rolling rate $\dot{\lambda}^M$ is not long-term stable, i.e. the result is valid only for a brief time. Depending on the design and accuracy of the rolling rate sensor used, the increase in the measurement error (referred to as drift) is between 1 degree/minute and 1 degree/second.

In order to avoid overflow errors during the integration 10, it is possible, according to an exemplary embodiment which is not illustrated, to transfer the functions of integration 10 and high pass filter 11 into an equivalent low pass filter with additional gain.

The calculation of the second roll angle variable $\lambda_2$ from the yaw rate $\dot{\psi}^M$ which is fixed to the motorcycle and the vehicle velocity v applies only to steady-state cornering. Function 13 is dependent on the tire geometry and the dynamic tire behavior of the motorcycle.

The filters 11, 14 used are usually first-order $PT_1$ elements. The cut-off frequency $f_{Trenn}$ is, for example, in the range from approximately 0.01 Hz to approximately 0.10 Hz.

The following explanation serves to substantiate the relationship between the yaw rate $\dot{\psi}^M$, vehicle velocity v and roll angle $\lambda$:

For steady-state cornering the following applies: the yaw rate $\dot{\psi}^M$ which is fixed to the motorcycle is provided by the yaw rate $\dot{\psi}^{roadway}$ which is fixed to the roadway and multiplied by the cosine of the total roll angle $\lambda_{ges}$, and by the pitch angle velocity $\dot{v}_{roadway}$, wherein, however, the pitch angle velocity $\dot{v}_{roadway}$ is zero for steady-state travel ($\dot{v}_{roadway}=0$), with the result that the second term $\sin \lambda_{ges} \cdot \dot{v}_{roadway}$ in equation (2) is eliminated:

$$\dot{\psi}^M = \cos \lambda_{ges} \cdot \dot{\psi}^{roadway} - \sin \lambda_{ges} \cdot \dot{v}_{roadway} = \cos \lambda_{ges} \cdot \dot{\psi}^{roadway} \quad (2)$$

For steady-state cornering, the following relationships also apply between the lateral acceleration $\ddot{y}^h$ in the horizontalized coordinate system (coordinate system which is rotated about the x axis with respect to the coordinate system which is fixed to the motorcycle, with the result that the horizontalized lateral acceleration $\ddot{y}^h$ extends parallel to the roadway), the vehicle velocity v, the yaw rate $\dot{\psi}^{roadway}$ which is fixed to the roadway, the tangent of the effective roll angle $\lambda_{th}$ and the gravitational acceleration g:

$$\ddot{y}^h = v \cdot \dot{\psi}^{roadway} \quad (3)$$

$$\tan \lambda_{th} = \frac{v \cdot \dot{\psi}^{roadway}}{g} \quad (4)$$

Insertion of (2) into (4) provides:

$$\tan \lambda_{th} = \frac{v \cdot \dot{\psi}^{roadway}}{g} = \frac{v \cdot \dot{\psi}^M}{\cos \lambda_{ges} \cdot g} \quad (5)$$

$$\sin \lambda_{th} \cdot \frac{\cos \lambda_{ges}}{\cos \lambda_{th}} = \frac{v \cdot \dot{\psi}^M}{g} \quad (6a)$$

Assuming that $\lambda_{ges} = \lambda_{th}$, this can also be simplified to yield:

$$\sin \lambda_{th} \approx \frac{v \cdot \dot{\psi}^M}{g} \quad (6b)$$

Therefore, the roll angle $\lambda_{th}$ is a function f of the product $\dot{\psi}^M \cdot v$ of the yaw rate $\dot{\psi}^M$ which is fixed to the motorcycle and the velocity v of the motorcycle:

$$f(\lambda_{th}) = \frac{\dot{\psi}^M \cdot v}{g} \quad (7)$$

The functional relationship $f(\lambda_{th})$ or the above equation (7) cannot be solved in a closed fashion. For this reason, a numerically acquired characteristic curve is used (block 13) in order to determine the roll angle $\lambda_{th}$ (according to the exemplary embodiment illustrated in FIG. 2 the roll angle variable $\lambda_2$) from the product (block 12) of the yaw rate $\dot{\psi}^M$ which is fixed to the motorcycle and the velocity v.

Figure 3:
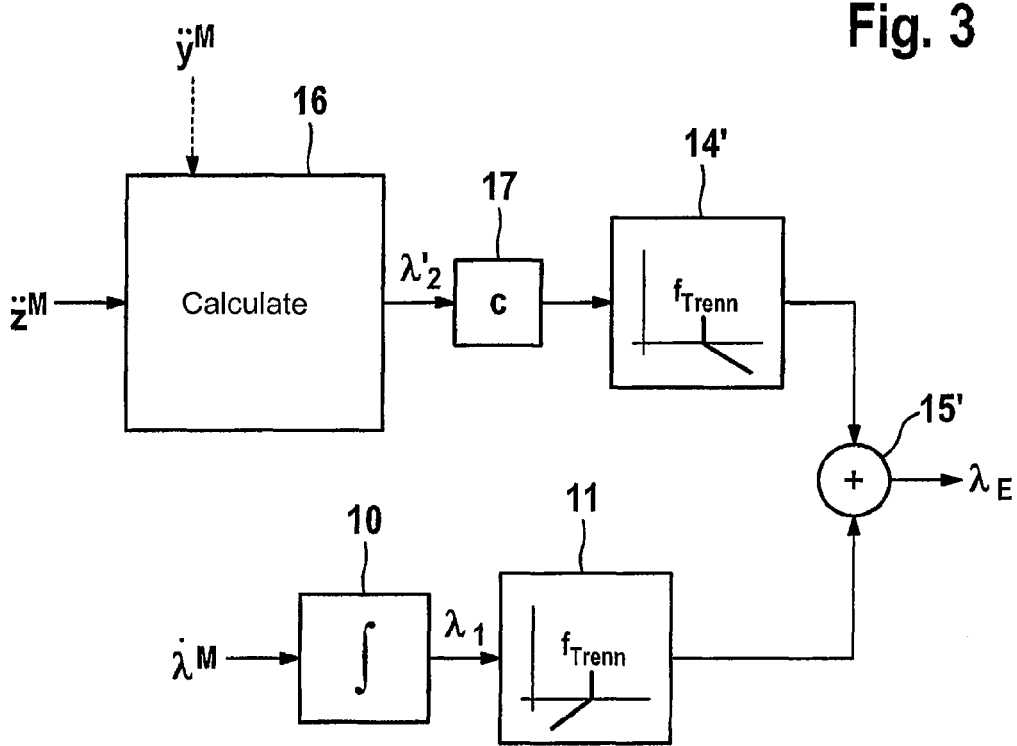
FIG. 3 is a schematic illustration of a second exemplary embodiment of a method, according to aspects of the invention.

FIG. 3 is a schematic illustration of a second exemplary embodiment of a method according to aspects of the invention. In this exemplary embodiment also, the integration 10 over time of the rolling rate $\dot{\lambda}^M$ which is fixed to the motorcycle is the first calculation result (the first roll angle variable $\lambda_1$), and here too the first roll angle variable $\lambda_1$ is filtered, for example, with a high pass filter 11, with, for example, a cut-off frequency $f_{Trenn}$ of 0.05 Hz. The explanation and alternative ways of calculating the first roll angle variable $\lambda_1$ which are given further above within the scope of the first exemplary embodiment apply here correspondingly. In contrast to the first exemplary embodiment, in the second exemplary embodiment the second calculation result (the second roll angle variable $\lambda_2'$) is determined essentially from the acceleration, fixed to the motorcycle, in the z direction $\ddot{z}^M$ (block 16). In order to take into account the width of the tire, the second roll angle variable $\lambda_2'$ in block 17 can be multiplied by an empirical factor c. In the second exemplary embodiment of the method according to aspects of the invention, the second calculation result $\lambda_2'$ is also filtered with a low pass filter 14' with, for example, the same cut-off frequency $f_{Trenn}$ as that of the high pass filter 11, this being for example 0.05 Hz. In order to determine the roll angle $\lambda_E$ of the motorcycle, the calculation result $\lambda_1$ of the integration 10 over time of the rolling rate $\dot{\lambda}^M$ which is fixed to the motorcycle and the calculation result $\lambda_2'$ are added to the determination of a roll angle variable from an acceleration, fixed to the motorcycle, in the z direction $\ddot{z}^M$ (block 15').

The filters 11, 14' used are customarily first-order $PT_1$ elements. The cut-off frequency $f_{Trenn}$ is, for example, in the range from approximately 0.01 Hz to approximately 0.10 Hz.

The calculation of the second roll angle variable $\lambda_2'$ from an acceleration which is fixed to the motorcycle in the z direction $\ddot{z}^M$ applies only to steady-state cornering. Furthermore, if the factor c is not taken into account (c=1), it is based on the assumption of ideally narrow tires. Furthermore, the acceleration, fixed to the motorcycle, in the z direction $\ddot{z}^M$ is not subject to a sign, with the result that a further information item, for example the acceleration, fixed to the motorcycle, in the y direction $\ddot{y}^M$, can be used to define the correct sign of the roll angle $\lambda$.

The following explanation serves to substantiate the relationship between the acceleration, fixed to the motorcycle, in the z direction $\ddot{z}^M$ and the roll angle $\lambda$:

For steady-state cornering the physically active roll angle $\lambda_{th}$ is provided by the arc cosine of the quotient of the gravitational acceleration g with respect to the vertical acceleration $\ddot{z}^M$ which is fixed to the motorcycle:

$$\lambda_{th} = \arccos \frac{g}{\ddot{z}^M} \quad (8)$$

In order to define the correct sign, the lateral acceleration $\ddot{y}^M$ which is fixed to the motorcycle can be used:

$$\lambda_{th} = \arccos\left(\left|\frac{g}{\ddot{z}^M}\right|\right) \cdot (-1) \cdot \text{sign}(\ddot{y}^M) \quad (9)$$

Here, sign(X) is the sign function which has the value "1" if X is greater than zero, which is "0" if X is equal to zero, and which is "−1" if X is less than zero.

As already mentioned above, the total roll angle $\lambda_{ges}$ can be approximated by the physically active roll angle $\lambda_{th}$:

$$\lambda_{ges} \approx \lambda_{th}$$

For example, the second roll angle variable $\lambda_2'$ is determined according to the equation (9) (block 16).

Figure 4:
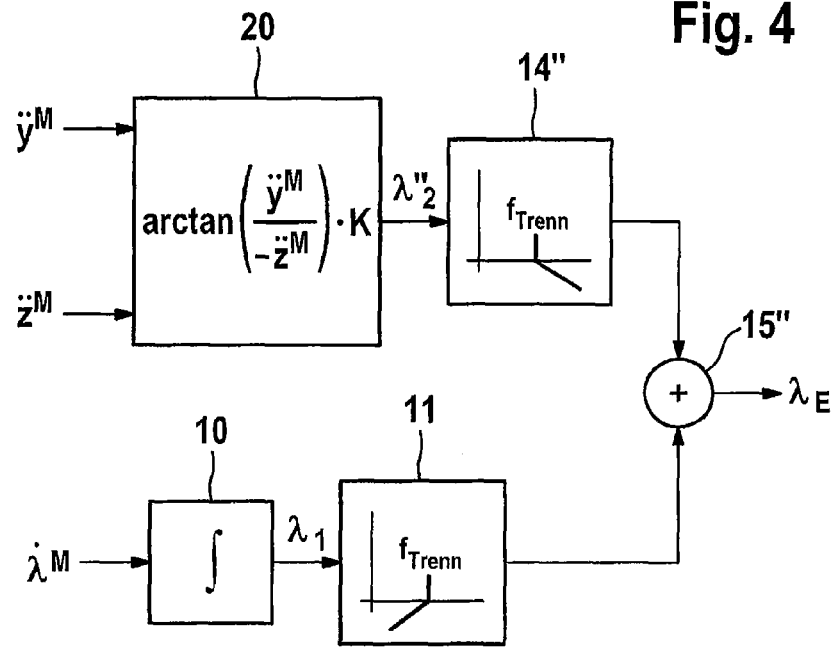
FIG. 4 is a schematic illustration of a third exemplary embodiment of a method, according to aspects of the invention.

A third exemplary embodiment of a method, according to aspects of the invention, is illustrated schematically in FIG. 4. In this exemplary embodiment, the integration 10 over time of the rolling rate $\dot{\lambda}^M$ which is fixed to the motorcycle is also the first calculation result (the first roll angle variable $\lambda_1$), and for example the first roll angle variable $\lambda_1$ is also filtered here with a high pass filter 11 with, for example, a cut-off frequency $f_{Trenn}$ of 0.05 Hz. The explanation and alternatives for the calculation of the first roll angle variable $\lambda_1$ which are given above within the scope of the first exemplary embodiment apply here correspondingly. In contrast to the first exemplary embodiment, in the third exemplary embodiment the second calculation result (the second roll angle variable $\lambda_2''$) is determined from two acceleration values which are fixed to the motorcycle, in particular an acceleration, fixed to the motorcycle, in the z direction $\ddot{z}^M$ and an acceleration, fixed to the motorcycle, in the y direction $\ddot{y}^M$ (block 20). The second calculation result $\lambda_2''$ is filtered with a low pass filter 14'' with, for example, the same cut-off frequency $f_{Trenn}$ as that of the high pass filter 11, this being, for example 0.05 Hz. In order to determine the roll angle $\lambda_E$ of the motorcycle, the calculation result $\lambda_1$ of the integration 10 over time of the rolling rate $\dot{\lambda}^M$ which is fixed to the motorcycle and the calculation result $\lambda_2''$ is added to the determination of a roll angle variable from two acceleration values which are fixed to the motorcycle, for example a vertical acceleration $\ddot{z}^M$ which is fixed to the motorcycle and a lateral acceleration $\ddot{y}^M$ which is fixed to the motorcycle (block 15'').

The filters 11, 14'' used are customarily first-order $PT_1$ elements. The cut-off frequency $f_{Trenn}$ is, for example, in the range from approximately 0.01 Hz to approximately 0.10 Hz.

The calculation of the second roll angle variable $\lambda_2''$ from an acceleration, fixed to the motorcycle, in the z direction $\ddot{z}^M$ and an acceleration, fixed to the motorcycle, in the y direction $\ddot{y}^M$ applies only to steady-state cornering. The calculation includes the geometry of the tire and the dynamic tire behavior of the motorcycle.

The following explanation serves to substantiate the relationship between the acceleration, fixed to the motorcycle, in the z direction $\ddot{z}^M$, the acceleration, fixed to the motorcycle, in the y direction $\ddot{y}^M$ and the roll angle $\lambda$:

As already mentioned above, the following relationship applies:

$$\lambda_{ges} = \lambda_{ZS} + \lambda_{th} \quad (10)$$

According to equation (8), for steady-state cornering the physically active roll angle $\lambda_{th}$ is provided by the arc cosine of the quotient of the gravitational acceleration g with respect to the vertical acceleration $\ddot{z}^M$ which is fixed to the motorcycle:

$$\lambda_{th} = \arccos\left(\frac{g}{\ddot{z}^M}\right) \quad (11)$$

Furthermore, for steady-state cornering the additional roll angle $\lambda_{ZS}$ is given by the arc tangent of the quotient of the lateral acceleration $\ddot{y}^M$ which is fixed to the motorcycle with respect to the vertical acceleration $\ddot{z}^M$ which is fixed to the motorcycle:

$$\lambda_{ZS} = \arctan\left(\frac{\ddot{y}^M}{-\ddot{z}^M}\right) \quad (12)$$

Insertion of equations (11) and (12) into (10) provides:

$$\lambda_{ges} = \arccos\left(\frac{g}{\ddot{z}^M}\right) + \arctan\left(\frac{\ddot{y}^M}{-\ddot{z}^M}\right) \quad (13)$$

For example, the total roll angle $\lambda_{ges}$ is approximated as a multiple k of the additional roll angle $\lambda_{ZS}$ which is conditioned by the width of the tire. It is therefore calculated according to the following relationship (block 20):

$$\lambda_{ges} = k \cdot \arctan\left(\frac{\ddot{y}^M}{-\ddot{z}^M}\right) \quad (14)$$

Here, the factor k is dependent on the geometry of the tire and the dynamic tire behavior of the motorcycle. An exemplary value is k=9.7.

An advantage of the method is that the roll angle $\lambda_E$ of the motorcycle is without time delay, apart from the time delays caused by the sensors. The roll angle $\lambda_E$ can be determined both under steady-state and non-steady-state travel conditions. Furthermore, the accuracy of the roll angle which is determined by a combination of two calculation methods is higher than is possible with an individual measuring method.

The integration of the rolling rate over time is in itself not suitable as a method for acquiring a roll angle. Owing to the measuring error which increases with time, this method cannot be applied directly with a standard sensor system.

A further advantage is that the manufacturing costs of a device for implementing the method are significantly lower than a highly accurate inertial sensor system, whilst having the same level of accuracy.

Compared to the first exemplary embodiment (FIG. 2) with a determination of the roll angle from two rotational speed signals (rolling rate $\dot{\lambda}^M$ and yaw rate $\dot{\psi}^M$), the manufacturing costs of the device for determining the roll angle according to the second and third exemplary embodiments from the rolling rate $\dot{\lambda}^M$, and one acceleration valve $\ddot{z}^M$ or two acceleration values $\ddot{z}^M$, $\ddot{y}^M$, are considerably reduced. Use of a sensor cluster, which is already known, for example, from the use in electronic stability programs (ESP) in passenger cars, is appropriate. Such a sensor cluster customarily provides a rotational speed signal and one or two acceleration signals. Such a sensor cluster can, if appropriate, be installed rotated through 90 degrees.

If the results of the integration 10 over time of the rolling rate $\dot{\lambda}^M$ which is fixed to the motorcycle and the function 13 of the product 12 of the yaw rate $\dot{\psi}^M$ which is fixed to the motorcycle and the velocity v of the motorcycle (first exemplary embodiment) are combined, it is advantageous that the position of the sensor system on the motorcycle is not relevant since the rotational speeds on the entire vehicle are the same.

Figure 5:
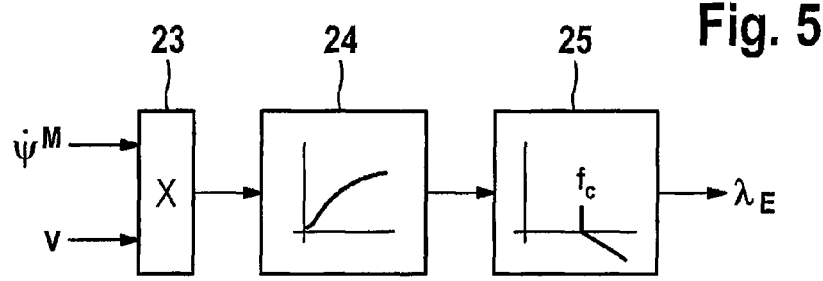
FIG. 5 is a schematic illustration of a method for determining a roll angle.

The invention also relates to a method for determining the roll angle of a motor cycle during travel from the product of the yaw rate which is fixed to the motorcycle and the velocity of the motorcycle. FIG. 5 is a schematic illustration of a corresponding exemplary embodiment. The product is formed from a yaw rate $\dot{\psi}^M$ which is fixed to the motorcycle and the velocity v of the motorcycle (block 23). A roll angle variable is determined from the product by means of a functional relationship, which is predefined for example in the form of a characteristic curve (block 24). After the calculation result has been filtered with a low pass filter 25, the roll angle $\lambda_E$ of the motorcycle is obtained.

The filter 25 is usually a first-order $PT_1$ element. The cut-off frequency is, for example, in the region of approximately 1 Hz.

According to an exemplary embodiment, not illustrated, a combination of a plurality of filters is used in order to reduce the signal peaks during rapid slalom travel: a low pass filter (cut-off frequency of approximately 0.05 Hz), a high pass filter (cut-off frequency of approximately 0.05 Hz, gain factor of 0.5), addition of the two signals and possibly further filtering with a low pass filter (cut-off frequency of approximately 1 Hz) in order to smooth the signals.

According to the above explanations (equations (2) to (7)), the roll angle λ is a function f of the product $\dot{\psi}^M \cdot v$ of the yaw rate $\dot{\psi}^M$ which is fixed to the motorcycle and the velocity v of the motorcycle (see equation (7)). A numerically acquired characteristic curve is used (block 24) to determine the roll angle λ from the product (block 23) of the yaw rate $\dot{\psi}^M$ which is fixed to the motor cycle and the velocity v.

The manufacturing costs of the device for implementing the method (determination of the roll angle from the product of the yaw rate which is fixed to the motorcycle and the velocity) are considerably lower compared to those for a highly accurate inertial sensor system while the accuracy is the same. The position of the sensor system on the motorcycle is not relevant since the rotational speed is the same over the entire vehicle.

Methods for determining a roll angle on the basis of acceleration measurement ($\ddot{z}^M$ or $\ddot{z}^M$, $\ddot{y}^M$) and a measurement of the rolling rate $\dot{\lambda}^M$ are described above. The fault tolerance of these methods can be increased by filtering the rolling rate $\dot{\lambda}^M$ with a first-order high pass filter, for example with a cut-off frequency of approximately 0.01 Hz.

The invention also relates to a method for checking the plausibility of the measured value of a roll angle-determining algorithm. In order to check the plausibility of the method, the roll angle can be determined for the steady-state travel condition, i.e. the second roll angle variable, redundantly using different methods. For example, a roll angle variable $\lambda_2$ and, respectively, $\lambda_2''$ can be determined from the yaw rate $\dot{\psi}^M$ which is fixed to the motorcycle and the velocity v as well as from the vertical acceleration $\ddot{z}^M$ which is fixed to the motorcycle and the lateral acceleration $\ddot{y}^M$ which is fixed to the motorcycle. Any selection of two or more roll angle-determining methods is conceivable. The trustworthiness of the roll angle $\lambda_E$ which is determined by means of the roll angle variable or variables can be estimated by comparing the results. Furthermore, under certain circumstances a sensor fault can be detected by the plausibility checking/the comparison. If there is a considerable difference between the roll angle variables $\lambda_2, \lambda_2', \lambda_2''$ which are determined in a variety of ways it is possible to infer a malfunction of one of the acceleration sensors or rotational speed sensors.

If the acceleration sensors which are present measure constant values over a specific time period, the rolling rate $\dot{\lambda}^M$ must be zero in this time period. An offset of the rolling rate sensor can therefore be determined and compensated.

Between any two travel conditions with a roll angle of zero degrees, the integral of the rolling rate $\dot{\lambda}^M$ is zero degrees. Given a known offset of the rolling rate sensor, the linearity fault of the rolling rate sensor can be determined by means of this condition.

Systems which are critical in terms of safety require information about the reliability of the roll angle signal. This reliability can be determined on the basis of the described method for the purpose of plausibility checking.

A traveling motorcycle must always be in a position of equilibrium. This is necessary both for straight-ahead travel and for cornering. The position of equilibrium of the motorcycle is dependent on a large number of different factors, for example the vehicle velocity v, the coefficient of friction between the tire and roadway, the wheel speeds $\omega_i$ (i=1 or 2 for the front wheel or rear wheel), the engine speed, the steering angle, the vehicle load, the inclination of the roadway, etc. These factors influence the equilibrium values for the rolling rate $\dot{\lambda}^M$, the yaw rate $\dot{\psi}^M$ and the three components of the vehicle acceleration $\ddot{x}^M$, $\ddot{y}^M$ and $\ddot{z}^M$.

Figure 6:
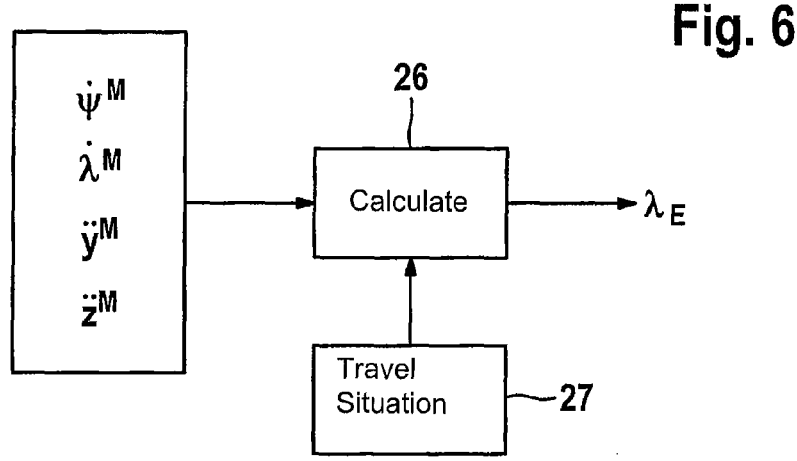
FIG. 6 is a schematic illustration of a fourth exemplary embodiment of a method, according to aspects of the invention.

FIG. 6 is a schematic illustration of a fourth exemplary embodiment of a method, according to aspects of the invention. The algorithm according to the example for the calculation 26 of the roll angle $\lambda_E$ is based on the measurements of the values for the yaw rate $\dot{\psi}^M$, the rolling rate $\dot{\lambda}^M$, the acceleration, fixed to the motorcycle, in the z direction $\ddot{z}^M$ and the acceleration, fixed to the motorcycle, in the y direction $\ddot{y}^M$ with corresponding sensors. In order to ensure a high level of accuracy, the algorithm must change adaptively as a function of the travel situation. In order to make this possible, it is necessary also to use the information from a plurality of vehicle systems (vehicle sensors), to estimate the current travel situation and to adapt the algorithm for the calculation 26 of the roll angle $\lambda_E$ in accordance with the travel situation. For this purpose, in block 27 the current travel situation is estimated on the basis of one or more of the following variables: engine speed, engine torque, steering angle, vehicle velocity v, vehicle acceleration, wheel speeds $\omega_i$, state of the roadway, wheel slip, vehicle load, inclination of the roadway. This estimation is then included in the calculation 26 of the roll angle $\lambda_E$.

It is also necessary to take into account the fact that the theoretical roll angle $\lambda_{th}$ and the total roll angle $\lambda_{ges}$ differ since the width of the tire is not equal to zero.

Figure 7:
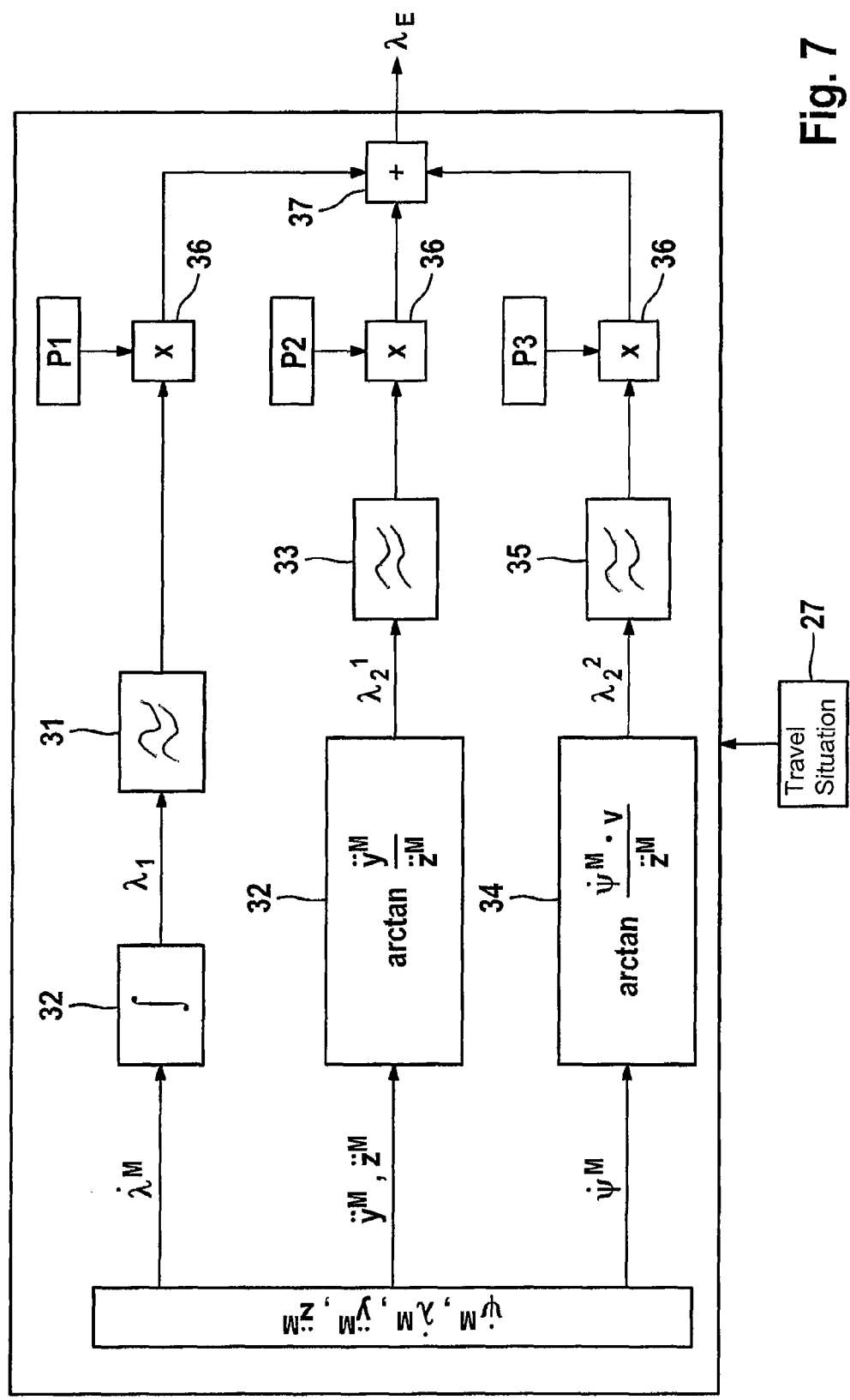
FIG. 7 is a schematic illustration of an exemplary method for adaptive calculation of a roll angle for use in the fourth exemplary embodiment illustrated in FIG. 7.

FIG. 7 is a schematic illustration of an exemplary method for adaptively calculating a roll angle $\lambda_E$. In order to ensure a high degree of accuracy, a combination of various methods is used to calculate the roll angle $\lambda_E$. At the same time, measurements of the rolling rate $\dot{\lambda}^M$, of the yaw rate $\dot{\psi}^M$ and of the accelerations in the z and y direction $\ddot{z}^M$, $\ddot{y}^M$ are carried out, for example with a sensor cluster. The integral 30 of the rolling rate $\dot{\lambda}^M$ is formed, and the result $\lambda_1$ is filtered with a high pass filter 31. Furthermore, in block 32 the arc tangent of the quotient of the acceleration in the y direction $\ddot{y}^M$ is calculated with respect to the acceleration in the z direction $\ddot{z}^M$, and the result $\lambda_2^1$ is filtered with a low pass filter 33. Likewise, in block 34 the arc tangent of the quotient of the product of the yaw rate $\dot{\psi}^M$ times the vehicle acceleration v is calculated to form the acceleration in the z direction $\ddot{z}^M$, and the result $\lambda_2^2$ is filtered with a low pass filter 35. The three results are multiplied by corresponding weighting parameters P1, P2 and P3 (blocks 36) and summed (block 37).

Properties of the system (for example filter properties) such as, for example, the cut-off frequencies of the individual filters 31, 33, 35 and/or the weighting parameters P1, P2, P3 are changed as a function of the current travel situation 27 which is detected by means of at least one of the abovementioned variables, for example the vehicle velocity v, wheel slip, wheel speeds con, engine speeds, steering angle, vehicle load, inclination of the roadway, rolling rate $\dot{\lambda}^M$, yaw raw $\dot{\psi}^M$, roll angle acceleration, yaw angle acceleration, and roll angle $\lambda_E$ (previously calculated, for example). The dependence of the system properties, for example the dependence of the cut-off frequencies of the filters and the dependence of the weighting parameters P1, P2, P3, on these variables are determined empirically or theoretically, stored in a control unit in the form of characteristic curves or characteristic diagrams or calculation rules and taken into account in the calculation of the roll angle. The system can be adapted for any travel situation and the roll angle $\lambda_E$ of the vehicle can be determined accurately by automatically changing the parameters (on the basis of the stored characteristic curves, characteristic diagrams or calculation algorithms).

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for determining a roll angle of a motorcycle comprising the steps of:
    acquiring a rolling rate ($\dot{\lambda}^M$) of the motorcycle;
    determining a first roll angle variable ($\lambda_1$) from the rolling rate ($\dot{\lambda}^M$);
    acquiring at least one vehicle movement dynamics characteristic variable from a velocity (v), a rotational speed ($\dot{\psi}^M$), an acceleration ($\ddot{z}^M$, $\ddot{y}^M$) of the motorcycle or a combination thereof;
    determining a second roll angle variable ($\lambda_2$) from one or more vehicle movement dynamics characteristic variables;
    calculating the roll angle ($\lambda_E$) on the basis of the roll angle variables ($\lambda_1$, $\lambda_2$);
    filtering the second roll angle variable ($\lambda_2$) with a low pass filter prior to the step of calculating the roll angle ($\lambda_E$); and
    filtering the first roll angle variable ($\lambda_1$) with a high pass filter prior to the step of calculating the roll angle ($\lambda_E$), wherein a cut-off frequency ($f_{Trenn}$) of the low pass filter that filters the second roll angle variable ($\lambda_2$) is substantially identical to a cut-off frequency of the high pass filter that filters the first roll angle variable ($\lambda_1$).

2. The method as claimed in claim 1, further comprising the step of calculating the first roll angle variable ($\lambda_1$) from the rolling rate ($\dot{\lambda}^M$) by integration over time.

3. The method as claimed in claim 1, further comprising the step of filtering the first roll angle variable ($\lambda_1$) with a high pass filter prior to the step of calculating the roll angle ($\lambda_E$).

4. The method as claimed in claim 1, further comprising the step of filtering the rolling rate ($\dot{\lambda}^M$) with a high pass filter having a cut-off frequency of approximately 0.01 Hz, prior to the step of determining the first roll angle variable ($\lambda_1$).

5. The method as claimed in claim 1, further comprising the step of acquiring the second roll angle variable from one of the following variables:
    a product of a yaw rate ($\dot{\psi}^M$) that is determined by a rotational speed sensor and a vehicle velocity (v),
    a yaw rate ($\dot{\psi}^M$), a vehicle velocity (v) and a vertical acceleration ($\ddot{z}^M$) of the motorcycle,
    a vertical acceleration ($\ddot{z}^M$) of the motorcycle, or
    a vertical acceleration ($\ddot{z}^M$) and a lateral acceleration ($\ddot{y}^M$) of the motorcycle.

6. The method as claimed in claim 5, wherein the second roll angle variable ($\lambda_2$) is determined from one or more vehicle movement dynamics characteristic variables on the basis of a characteristic curve that is stored in a control unit or a characteristic diagram that is stored in a control unit, or on the basis of a calculation algorithm.

7. The method as claimed in claim 1, further comprising the steps of:
    determining two or more second roll angle variables ($\lambda_2$, $\lambda_2$") in different ways from one or more of the vehicle movement dynamics characteristic variables ($\dot{\psi}^M$, v, $\ddot{z}^M$, $\ddot{y}^M$),
    determining at least one roll angle variable ($\lambda_2$") from at least one acceleration variable ($\ddot{z}^M$, $\ddot{y}^M$) of the motorcycle, and
    comparing the second roll angle variables ($\lambda_2$, $\lambda_2$") for plausibility, checking of the roll angle ($\lambda_E$).

8. The method as claimed in claim 7, further comprising the steps of comparing second roll angle variables ($\lambda_2$, $\lambda_2$") and detecting a malfunction of either an acceleration sensor or a rotational speed sensor, either of which are used in acquiring the rolling rate ($\dot{\lambda}^M$) of the motorcycle, on the basis of the comparing step.

9. The method as claimed in claim 1, wherein the step of acquiring a rolling rate ($\dot{\lambda}^M$) of the motorcycle comprises the sub-steps of:
    acquiring acceleration values; and
    determining an offset of a rotational speed sensor, which is used in acquiring the rolling rate ($\dot{\lambda}^M$) of the motorcycle, from the acquired acceleration values.

10. The method as claimed in claim 9, wherein a linearity fault of the rolling rate is determined using the offset of the rotational speed sensor.

11. The method as claimed in claim 1, wherein the step of calculating the roll angle ($\lambda_E$) includes the sub-steps of:
    filtering at least two roll angle variables ($\lambda_1$, $\lambda_2^1$, $\lambda_2^2$) with a high pass filter or a low pass filter;
    weighted summing of the at least two roll angle variables ($\lambda_1$, $\lambda_2^1$, $\lambda_2^2$) with weighting parameters (P1, P2, P3), wherein the weighting parameters (P1, P2, P3) are adapted as a function of a current travel situation,
    the current travel situation being detected on the basis of at least one of the following variables: engine speed, engine torque, steering angle, vehicle velocity (v), vehicle acceleration, wheel speed ($\omega_i$), state of a roadway, rolling rate ($\dot{\lambda}^M$), yaw rate ($\dot{\psi}^M$), roll angle acceleration, yaw angle acceleration, roll angle ($\lambda_E$), wheel slip, vehicle load, inclination of the roadway.

12. The method as claimed in claim 11, further comprising the step of selecting the cut-off frequencies of the filters for filtering the roll angle variables ($\lambda_1$, $\lambda_2^1$, $\lambda_2^2$) as a function of the current travel situation.

13. A device for determining the roll angle of a motorcycle, said device comprising:
- at least one evaluation unit;
- a means for acquiring a rolling rate ($\dot{\lambda}^M$) of the motorcycle; and
- at least one means for acquiring at least one vehicle movement dynamics characteristic variable;
- wherein the at least one vehicle movement dynamics characteristic variable is a vehicle velocity (v), a yaw rate ($\dot{\psi}^M$) of the motorcycle, an acceleration ($\ddot{z}^M$, $\ddot{y}^M$) of the motorcycle or a combination thereof;
- wherein the at least one evaluation unit comprises an adding circuit for adding two roll angle variables ($\lambda_1$, $\lambda_2$) to calculate a roll angle ($\lambda_E$), wherein a first roll angle variable ($\lambda_1$) is determined from the rolling rate ($\dot{\lambda}^M$) of the motorcycle, and a second roll angle variable ($\lambda_2$) is determined using the at least one vehicle movement dynamics characteristic variable;
- wherein the at least one evaluation unit comprises a low pass filter for filtering the second roll angle variable ($\lambda_2$) before calculating the roll angle ($\lambda_E$),
- wherein said at least one evaluation unit further comprises a high pass filter for filtering the first roll angle variable ($\lambda_1$) before calculating the roll angle ($\lambda_E$), wherein the low pass filter has a cut-off frequency ($f_{Trenn}$) that is substantially equal to a cut-off frequency of the high pass filter.

14. The device as claimed in claim 13, wherein the at least one evaluation unit comprises a high pass filter for filtering the rolling rate ($\dot{\lambda}^M$).

15. The device as claimed in claim 14, wherein the at least one evaluation unit comprises an integrating circuit for integrating the first roll angle variable ($\lambda_1$) from the filtered rolling rate ($\dot{\lambda}^M$).

16. The device as claimed in claim 13, wherein the at least one evaluation unit comprises a high pass filter for filtering the first roll angle variable ($\lambda_1$) before calculating the roll angle ($\lambda_E$).

17. The device as claimed in claim 13, wherein the at least one evaluation unit comprises a circuit for determining the second roll angle variable ($\lambda_2$) from one of the following variables:
- a yaw rate ($\dot{\psi}^M$) and a vehicle velocity (v) on the basis of a characteristic curve or a characteristic diagram,
- a yaw rate ($\dot{\psi}^M$), a vehicle velocity (v) and a vertical acceleration ($\ddot{z}^M$) of the motorcycle,
- a vertical acceleration ($\ddot{z}^M$) of the motorcycle, or
- a vertical acceleration ($\ddot{z}^M$) and a lateral acceleration ($\ddot{z}^M$) of the motorcycle.

18. A method for determining a roll angle of a motorcycle comprising the steps of:
- acquiring a rolling rate ($\dot{\lambda}^M$) of the motorcycle;
- determining a first roll angle variable ($\lambda_1$) from the rolling rate ($\dot{\lambda}^M$);
- acquiring at least one vehicle movement dynamics characteristic variable from a velocity (v), a rotational speed ($\dot{\psi}^M$), an acceleration ($\ddot{z}^M$, $\ddot{y}^M$) of the motorcycle or a combination thereof;
- determining a second roll angle variable ($\lambda_2$) from one or more vehicle movement dynamics characteristic variables;
- calculating the roll angle ($\lambda_E$) on the basis of the roll angle variables ($\lambda_1$, $\lambda_2$); and
- filtering the rolling rate ($\dot{\lambda}^M$) with a high pass filter having a cut-off frequency of approximately 0.01 Hz, prior to the step of determining the first roll angle variable ($\lambda_1$).

19. A method for determining a roll angle of a motorcycle comprising the steps of:
- acquiring a rolling rate ($\dot{\lambda}^M$) of the motorcycle;
- determining a first roll angle variable ($\lambda_1$) from the rolling rate ($\dot{\lambda}^M$);
- acquiring at least one vehicle movement dynamics characteristic variable from a velocity (v), a rotational speed ($\dot{\psi}^M$), an acceleration ($\ddot{z}^M$, $\ddot{y}^M$) of the motorcycle or a combination thereof;
- determining a second roll angle variable ($\lambda_2$) from one or more vehicle movement dynamics characteristic variables;
- calculating the roll angle ($\lambda_E$) on the basis of the roll angle variables ($\lambda_1$, $\lambda_2$);
- determining two or more second roll angle variables ($\lambda_2$, $\lambda_2''$) in different ways from one or more of the vehicle movement dynamics characteristic variables ($\dot{\psi}^M$, v, $\ddot{z}^M$, $\ddot{y}^M$);
- determining at least one roll angle variable ($\lambda_2''$) from at least one acceleration variable ($\ddot{z}^M$, $\ddot{y}^M$) of the motorcycle; and
- comparing the second roll angle variables ($\lambda_2$, $\lambda_2''$) for plausibility checking of the roll angle ($\lambda_E$).

20. A method for determining a roll angle of a motorcycle comprising the steps of:
- acquiring a rolling rate ($\dot{\lambda}^M$) of the motorcycle;
- determining a first roll angle variable ($\lambda_1$) from the rolling rate ($\dot{\lambda}^M$);
- acquiring at least a velocity (v) and a yaw rate ($\dot{\psi}^M$) of the motorcycle;
- determining a second roll angle variable ($\lambda_2$) from a product of the yaw rate ($\dot{\psi}^M$) that is determined by a rotational speed sensor and the vehicle velocity (v) without using a measured lateral acceleration ($\ddot{y}^M$), and
- calculating the roll angle ($\lambda_E$) on the basis of the roll angle variables ($\lambda_1$, $\lambda_2$).

21. A device for determining a roll angle of a motorcycle, said device comprising:
- at least one evaluation unit;
- a means for acquiring a rolling rate ($\dot{\lambda}^M$) of the motorcycle; and
- at least one means for acquiring a vehicle velocity (v) and one means for acquiring a yaw rate ($\dot{\psi}^M$) of the motorcycle;
- wherein the at least one evaluation unit comprises an adding circuit for adding two roll angle variables ($\lambda_1$, $\lambda_2$) to calculate the roll angle ($\lambda_E$), wherein a first roll angle variable ($\lambda_1$) is determined from the rolling rate ($\dot{\lambda}^M$) of the motorcycle, and a second roll angle variable ($\lambda_2$) is determined from the product of the yaw rate ($\dot{\psi}^M$) and the vehicle velocity (v) without using a measured lateral acceleration ($\ddot{y}^M$).

* * * * *